Aug. 13, 1968  RYUSUKE SASAGAWA ET AL  3,397,089
STORAGE BATTERY WITH TRANSPARENT COVER
HAVING CONNECTORS IN CHANNELS
Filed March 8, 1966  4 Sheets-Sheet 1
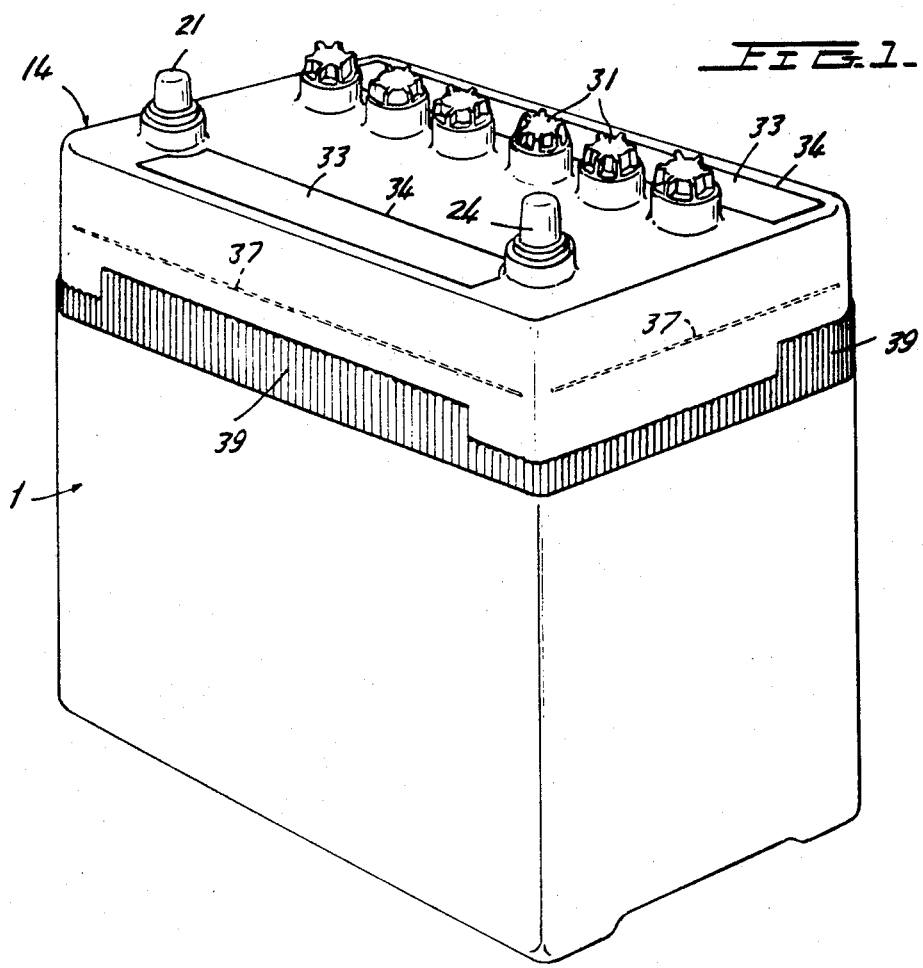
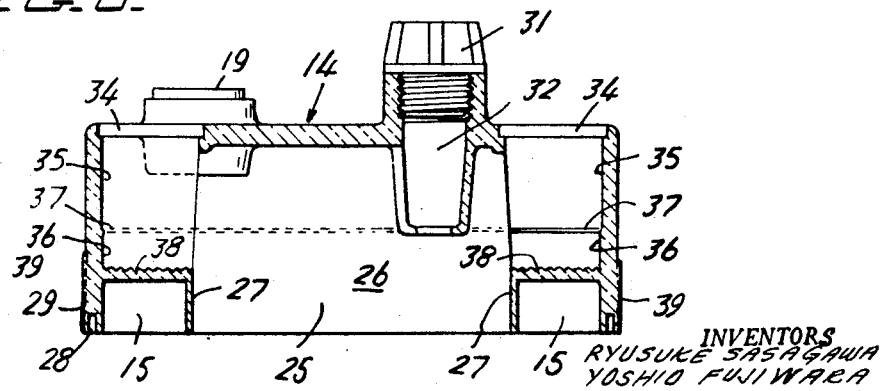
INVENTORS
RYUSUKE SASAGAWA
YOSHIO FUJIWARA
TAKASHI KOSUGE
ICHIRO SANO
OSTROLENK, FABER, GERB & SOFFEN
ATTORNEYS

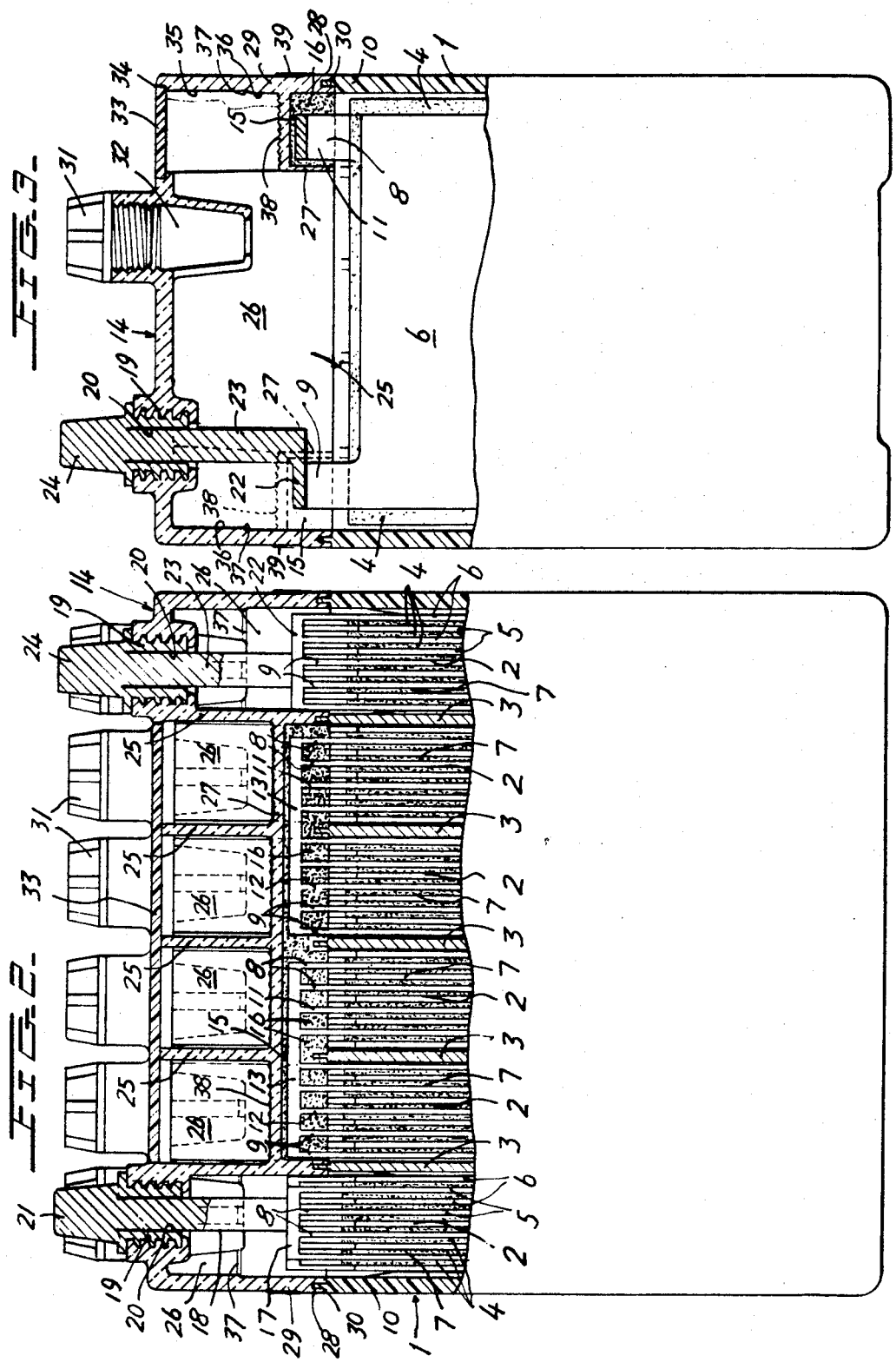

INVENTORS
RYUSUKE SASAGAWA
YOSHIO FUJIWARA
TAKASHI KOSUGE
ICHIRO SANO

OSTROLENK, FABER, GERB & SOFFEN
ATTORNEYS

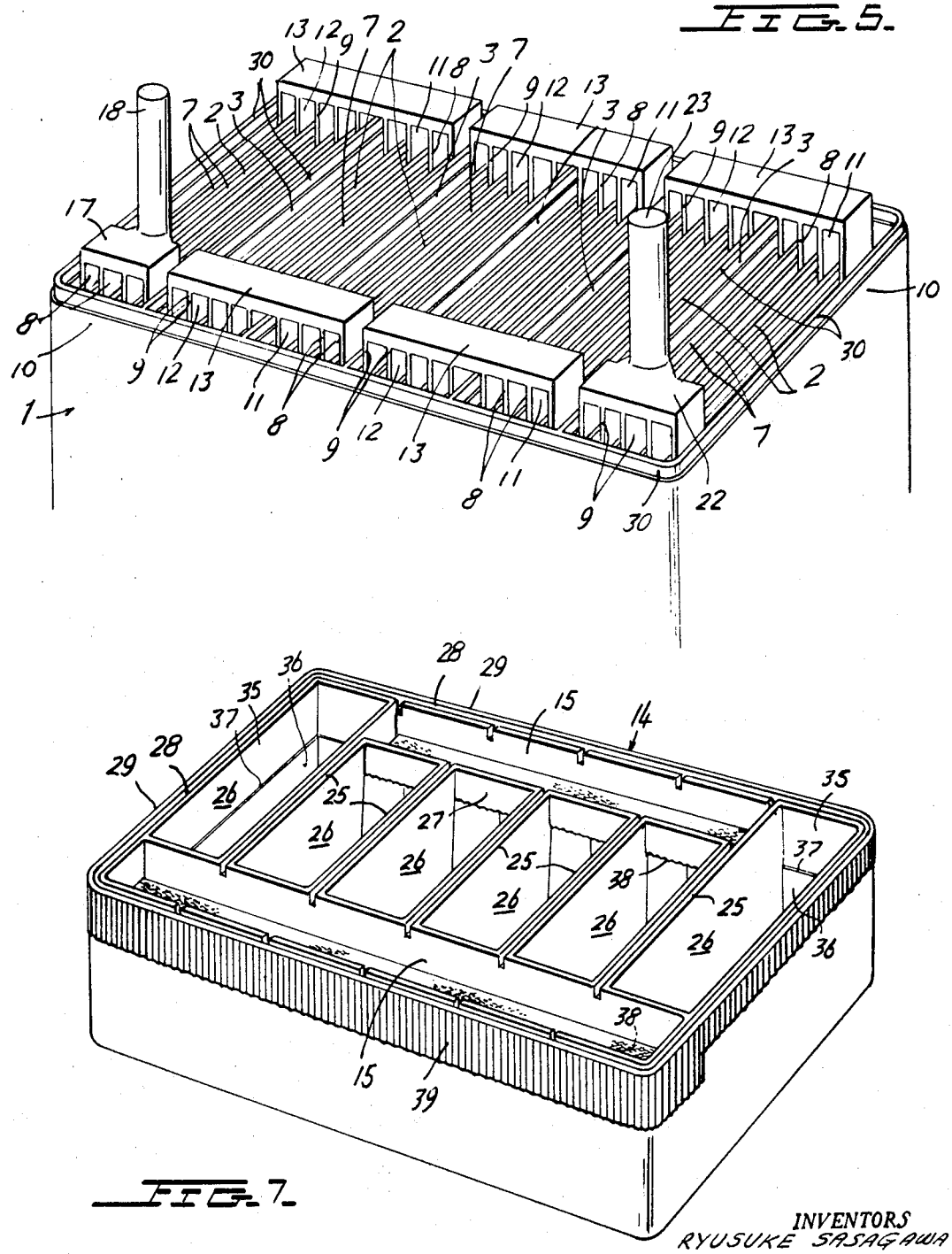

United States Patent Office 3,397,089
Patented Aug. 13, 1968

3,397,089
STORAGE BATTERY WITH TRANSPARENT COVER HAVING CONNECTORS IN CHANNELS
Ryusuke Sasagawa, Yoshio Fujiwara, Takashi Kosuge, and Ichiro Sano, Kanagawa, Japan, assignors to Furukawa Denchi Kabushiki Kaisha, Kanagawa, Japan, a corporation of Japan
Filed Mar. 8, 1966, Ser. No. 532,777
Claims priority, application Japan, Aug. 16, 1965, 40/66,886
4 Claims. (Cl. 136—170)

ABSTRACT OF THE DISCLOSURE

A storage battery including a container and cover which matingly cooperate to define a plurality of sealingly insulated plate group compartments. The undersurface of the cover includes a pair of longitudinally extending grooves which receive the connector straps connecting extending ear portions of the proper alternately disposed negative and positive plates of the respective plate groups. The cover also includes channel-like grooves along the partitions which define the plate group compartments and also along the side walls defining the cover. All such side wall and partition channel-like grooves communicate with the longitudinally extending grooves which house the connector straps whereby insulating filler such as an epoxy resin will embed the connector straps and ear portions of the plate groups while at the same time insulatingly secure the respective compartments from each other and aid in securing the cover to the base container.

---

Figure 4:
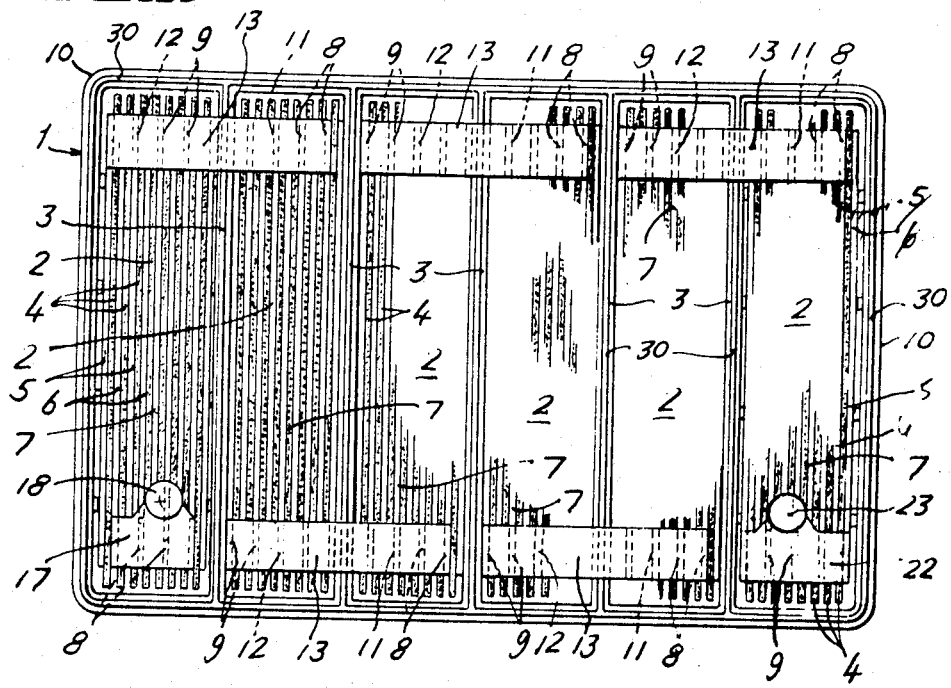

This invention relates to a storage battery of the type wherein a plurality of plate groups each encased in a respective compartment in a battery container are connected in series for constructing a unitary battery, which is suitable for use on a vehicle such as an automobile, a two-wheeled car or the like.

In a conventional battery of this kind, a connection between the proper plate groups of adjacent compartments is effected by the way that the upstanding ears of similar plates within a given compartment are individually connected by respective connector straps. Posts are stood on the connection straps and project beyond the upper edge of the battery container whereby they may be connected to one another by a connector bar. This type of connection, effected through posts and straps, has many defects in that a large quantity of lead is spent and a considerable time in welding is required. Further, not only is the electrical path lengthened but also an inner electric resistance is increased, and accordingly a voltage characteristic in a rapid discharge becomes inferior and the starting ability of a vehicle worsens.

As noted, it is usual in this prior art type of connection that the posts project upwards from the upper surface of the cover of the battery such that these projecting portions may be connected together by the connector bar. This makes the appearance bad because the post projecting portions and the connector bar project over the upper portion of the cover body. As for methods to solve this, it has been proposed that a hollow be made in the upper surface of the cover body to maintain therein the post projecting portions and the connector bar and that a filling agent be applied in such hollow to cover the external surface thereof. This, however, cannot bring about a complete solution because the mark of the filled in portion remains in the appearance. It has been also proposed that the posts and the connector bar be previously connected as a U-shaped member embedded in the cover body such that the posts may project downwardly. This method, however, causes difficulty in welding such downwardly depending posts to the plate group.

In contradistinction to the prior art, the instant invention provides a battery container divided by partition walls into several compartments, each containing a plate group comprising negative and positive plates and put in layers alternatively through separators with upstanding ears of said negative and positive plates extending upwards beyond the upper edge of the side wall of the container to form projecting portions. The ears are so arranged that those of opposite polarity in adjacent compartments will be aligned and can be connected to one another by a connector strap. A cover body applied to the upper surface of the container is provided with a groove on its reverse side which receives the upstanding projecting portions of such ears as well as a filling agent which is applied to said groove to obtain a fixing of said cover body and strap and a subsequently solidified liquid insulation between the adjacent compartments of the container.

Accordingly, it is an object of the instant invention to remove defects in the conventional storage battery, and to remarkably reduce the consumption amount of lead and also to facilitate a process for connecting between the plate groups to reduce a working cost, and further to obtain a battery wherein an electrical path is shortened and an interior resistance is reduced, and further an excellent rapid discharge voltage characteristic is achieved for greatly improving a starting ability, and also to obtain a battery wherein an insulation between the compartments can be obtained easily and surely and also no connector strap is exposed on the upper surface of the cover body to make a good appearance.

Figure 6:
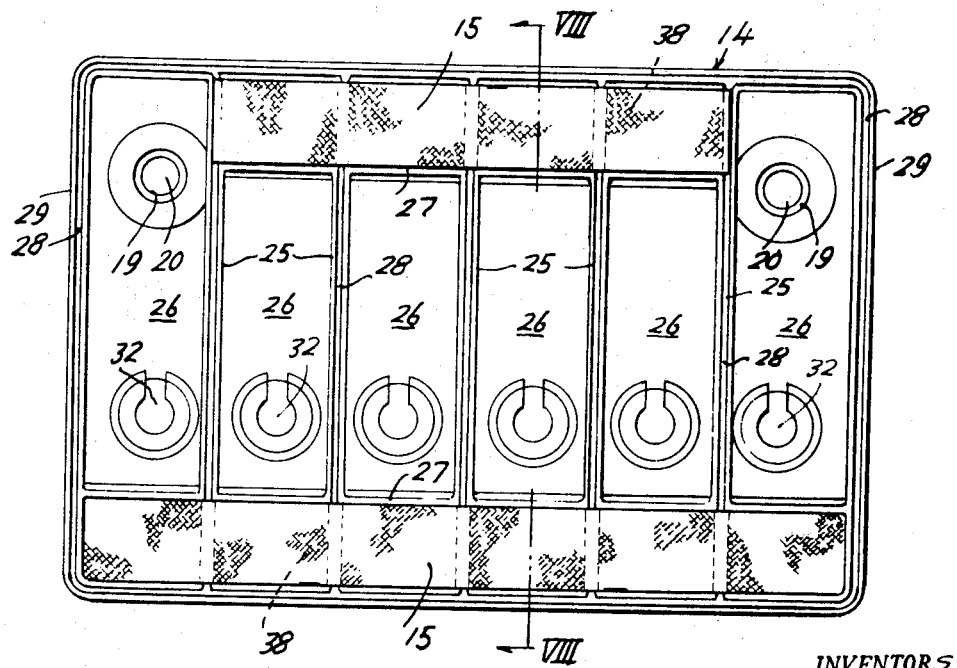

Other objects and a fuller understanding of the invention may be had by referring to the following description and drawings, in which:

FIGURE 1 is a perspective view of a storage battery constructed in accordance with the instant invention;
FIGURE 2 is a front view, partly in section, thereof;
FIGURE 3 is a side view, partly in section, thereof;
FIGURE 4 is a plan view of a battery container with a cover body removed therefrom;
FIGURE 5 is a perspective view thereof;
FIGURE 6 is a reverse surface view of the cover body;
FIGURE 7 is a perspective view thereof; and
FIGURE 8 is a sectional view taken along the line VIII—VIII in FIGURE 6.

Referring more specifically to FIGURES 2, 4 and 5 of the drawings, the interior of the battery container 1 is divided into six compartments 2 by partition walls 3 of the same height as a side wall 10. Each compartment includes a plate group 7 comprising negative plates 5 and positive plates 6 alternatively put in layers by means of separators 4. Plates 5 and 6 of each plate group 7 include ears 9 and 8, respectively, positioned on opposite sides of the container 1 from each other (see FIGURE 5), such that opposite polarity ear groups of adjacent plate groups 7 are aligned on the same side of the container 1. Upstanding projecting portions 12 and 11 of the ears 9 and 8 of the negative and positive plates 5 and 6, respectively, can be obtained by raising a supporting rib (not shown) on which the negative and positive plates 5 and 6 are rested, or by lowering the height of the battery container 1 and so on. Thus the ears 9 and 8 of the respective negative and positive plates of the above mentioned plate groups 7 are projected higher than the side wall 10 of the battery container 1 to provide the projecting portions 12 and 11, and thereby there is brought such convenience that any welding which must be done on the ear groups say be facilitated and become possible even under the condition that the plate groups have already been placed in the battery container 1.

As shown in FIGURE 2 and FIGURE 4, the opposite polarity ear groups 8 and 9 of each adjacent plate group 7 are connected by the connector strap 13 crossing horizontally over the partition wall 3. Thus, the welding process is simplified and an electrical path is shortened and an interior resistance is decreased as compared with the prior art connection of the adjacent opposite polarity ear groups by means of individual straps for each plate group and interconnected posts stood on such straps.

The ear group 8 of the positive plates 6 of the plate group 7 in one end compartment are connected together by a connector strap 17 to which a post 18 is welded, and a top end of the post 18 extends to pass through an opening 20 of a lead bushing 19 arranged integrally with the cover body 14 for projecting over the cover body 14 and the projecting portion thereof is formed by lead welding into a positive terminal 21 integral with the lead bushing 19. Likewise, the ear group of the negative plates 5 of the plate group 7 in the other end compartment are connected by a connector strap 22 and the top end of a post 23 connected thereto is formed into a negative terminal 24 at the exterior of the cover body 14. It is not always necessary that the connector straps 13, 17 and 22 be previously prepared, since they may be formed by welded lead in a welding operation applied to the respective ear groups.

The cover body 14 is formed by molding of synthetic resin or the like into a box shape, and a plurality of comparemnts 26 corresponding to the compartments 2 of the battery container 1 are formed therein by partition plates 25. Grooves 15, for accommodating the connector straps 13 and the projecting portions 11 and 12 of the ears, are formed along the opposite side walls at the lower portions of the opposite side portions of the partition plates 25.

In the drawings, each partition plate 25 is formed to have its side portions shorter than its central portion to thereby accommodate a longitudinal groove frame 27 of L-shape section which projects integrally from corresponding side walls 10 of the cover body to form the grooves 15. Thus, the grooves 15 are comparatively shallow, so that the consumption amount of the sealing agent 16 to be filled therein can be saved.

Recess 28 is a continuous fitting groove made along the lower edge of the peripheral wall 29 and the lower edges of the partition plates 25 of the cover body 14, and is designed to receive a continuous projecting rim 30 projecting from the upper edge of the peripheral wall 10 and also the upper edges of the partition wall 3 of the battery container 1. It is general in fitting operation that an adhesive material be applied in the recess 28, so that when the cover body 14 is applied to the battery container 1, the groove 28 and the rim 30 are fixed together in fluid-tight relationship. In order to assure that adjacent compartments 2 are insulated in fluid-tight relationship with respect to one another and also to secure the connector straps 13 with respect to the cover body 14 by means of the sealing agent 16 filled in the grooves 15; the cover body 14 is applied to the container 1 in the following manner.

The cover body 14 is placed with the reverse side thereof turned upwardly, and the sealing agent 16, such as epoxy resin or the like, is filled in the groove 15. Then, the battery container 1 turned reversely is put on the said cover body 14 so that the connector strap 13 and the projecting portions 11 and 12 of ears 8 and 9 may be inserted in the groove 15 and left as is for a time sufficient for the sealing agent 16 to harden. Thereby, the sealing agent 16 is set in such a state that the same embeds the connector strap 13 and the projections 11 and 12, so that the respective compartments 2 are surely insulated in liquid-tight relationship one from another and simultaneously the connector strap 13 and the cover body 14 are secured integrally one with the other. In FIGURE 8, 31 is a filler plug applied in a filler opening 32, and 33 is a cover plate fitted in fluid-tight relationship by adhesive agent in an opening 34 made in either side of the upper surface of the cover body 14.

Further, and as seen most clearly in FIGURE 3, the cover body 14 is so prepared by molding that its side wall 29 comprises a thin wall 35, a thick wall 36 and a step 37 at the border thereof, and the step 37 is designed to serve as a liquid level indicating line. Namely, the cover body 14 is preferably made of transparent synthetic resin, so that the step 37 reflects light to present a line acting as a clear liquid level indicating line and the same is durable in along time use without coming off as is the case with a conventional one made in paint. Furthermore, the manufacturing of the cover body 14 is materially simplified in comparison with the conventional one wherein an indicating line is engraved after molding of the cover body. In the drawing, the liquid level indicating line 37 extends through the whole periphery of the side wall of the cover body 14 for permitting an accurate observation of a liquid level from all directions.

As noted, the battery as illustrated is so constructed that the cover body 14 is made of transparent material such as synthetic resin and the like while the battery container 1 is made of opaque material or translucent material, so that any soils of the contents such as the plates or the like in the battery container 1 becomes unvisible from the outside and at the same time the state of the interior such as the level of electrolyte or the like becomes observable through the cover body 14. Roulettes 38 and 39 are applied in the upper surface of the frames 27 and the outer surface of the cover body 14, respectively, so that the sealing agent 16 of the interior cannot be seen at all from the outside.

In the present invention, the plate group 7 is accommodated in each compartment 2 of the battery container in such a manner that the ears 9 and 8 of the negative and positive plates 5 and 6 thereof may project beyond the upper edge of the side wall 10 of the container 1, so that a welding process can be simplified and the consumption amount of lead is greatly decreased and a cost is reduced and an electrical path is shortened, and the interior resistance is remarkably reduced to improve a voltage characteristic in rapid discharge as well as a starting ability. Additionally, the connector strap 13 and the projecting portions 11 and 12 are accommodated in the groove 15 made in the inner surface of the cover body 14 and the sealing agent 16 is filled in the groove 15 for achieving the fixing of the cover body 14 and the connector strap 13 and the fluid insulation between the adjacent compartments 2, so that the fixing of the cover body 14 and the connector strap 13 and the fluid insulation between the compartments 2 can be accomplished surely and easily and a storage battery of a good external appearance can be easily obtained.

Although there has been described a preferred embodiment of this novel invention, many variations and modifications will now be apparent to those skilled in the art. Therefore, this invention is to be limited, not by the specific disclosure herein, but only by the appending claims.

What is claimed is:
1. A storage battery comprising:
   a container having a plurality of partition walls defining a plurality of individual compartments;
   a plurality of plate groups each of which is contained in an individual one of said compartments, each of said plate groups including alternately disposed negative and positive plates which include integral ear portions extending upwards beyond the upper edges of said partitions, the ear portions of the negative plates of every other plate group being aligned with the ear portions of the positive plates of the plate groups interposed between said every other plate group;
   connector straps extending over said upper edges of said partition and joining the ear portions of the nega- tive and positive plates of adjacent plate groups so as to form a series circuit through said plurality of plate groups;

a cover positioned on said container, said cover having a pair of side walls and a plurality of partitions defining a plurality of compartments which are aligned with the compartments in said container, said partitions which define the compartments in said cover including channel-like grooves along their edges which receive the upper edges of the partitions defining the compartments in said container;

said cover further including a pair of grooves extending along said side walls to house said connector straps and said ear portions of said negative and positive plates of each of said plate groups, said pair of grooves communicating with said channel-like grooves in the upper edges of the partitions defining the compartments in said cover;

said pair of grooves and channel-like grooves being filled with insulating material which thereby embeds said connector straps and said ear portions; secures said connector straps to said cover; secures the upper edges of the partitions defining the compartments in said container to the channel-like grooves in the partitions defining the compartments in said cover; and sealingly insulates adjacent compartments in said container and cover.

2. The storage battery of claim 1, wherein said grooves are formed by generally L-shaped projections extending integrally from said side walls of said cover.

3. The storage battery of claim 1 wherein said cover includes a second pair of side walls oriented transversely with respect to said first pair of side walls; said side walls of said first and second pairs including channel-like grooves along their edges thereof which communicate with said grooves which extend along said first pair of side walls, said channel-like grooves in the edges of said side walls being filled by said insulating material, said channel-like grooves in the edges of the side walls of said cover receiving cooperating side walls of said container.

4. A storage battery comprising:
a container having a plurality of individual compartments therein;
a plurality of plate groups each of which is contained in an individual one of said compartments, each of said plate groups including alternately disposed negative and positive plates which include upstanding ear portions as integral portions thereof; the ear portions of the negative plates of every other plate group being aligned with the ear portions of the positive plates of the plate groups interposed between said every other plate group;

connector straps joining the ear portions of the negative and positive plates of adjacent plate groups so as to form a series circuit through said plurality of plate groups;

a cover positioned on said container; said cover having a pair of side walls and a plurality of compartments spaced intermediate said side walls, said compartments of said cover being aligned with the compartments of said container; said cover further including a pair of grooves extending along said side walls to house said connector straps;

said grooves being formed by generally L-shaped projections extending integrally inwardly from said side walls; said grooves being filled with insulating material which insulates said compartments of said container from one another and secures said connector straps to said cover;

said cover including a second pair of side walls oriented transverse with respect to said first pair of side walls; said side walls of said first and second pairs including a thick portion, a thin portion and a step portion joining said thick and thin portions; said cover portion being formed of transparent material whereby said step portions may serve as an indicating line.

References Cited
UNITED STATES PATENTS

| | | | |
|---|---|---|---|
| 1,368,817 | 2/1921 | Marko | 136—170.1 |
| 2,886,622 | 5/1959 | Shannon | 136—170 |
| 3,261,719 | 6/1966 | Shannon | 136—134 |
| 3,301,713 | 1/1967 | Lozeau | 136—177 |

FOREIGN PATENTS 969,087   9/1964   Great Britain.

WINSTON A. DOUGLAS, *Primary Examiner.*

D. L. WALTON, *Assistant Examiner.*